United States Patent [19]

Jung

[11] Patent Number: 4,775,936

[45] Date of Patent: Oct. 4, 1988

[54] OVERBOOKING SYSTEM

[76] Inventor: Jerrold M. Jung, 49520 W. Seven Mile Rd., Northville, Mich. 48167

[21] Appl. No.: 846,225

[22] Filed: Mar. 31, 1986

[51] Int. Cl.⁴ .............................................. G06F 15/20
[52] U.S. Cl. .................................... 364/407; 364/401
[58] Field of Search ... 364/403, 407, 401, 200 MS File, 364/900 MS File; 235/380, 381; 370/94

[56] References Cited

U.S. PATENT DOCUMENTS 4,375,097  2/1983  Ulug ...................................... 370/94

FOREIGN PATENT DOCUMENTS 1180916  9/1985  U.S.S.R. ............................... 364/407

OTHER PUBLICATIONS

Marvin Rothstein, "OR and the Airline Overbooking Problem", Mar.–Apr. 1985, pp. 237–247.

*Primary Examiner*—Jerry Smith
*Assistant Examiner*—Kim Thanh Tbui
*Attorney, Agent, or Firm*—Harness, Dickey & Pierce

[57] ABSTRACT

A system and method for determining a recommended overbooking level for a scarce resource such as seats on a vehicle, e.g. an aircraft, so that the the advance bookings are at a level which maximizes profits while, at the same time, minimizes dissatisfaction with supply. When used with an airline reservation system the system and method of the invention collect information about the past history of the passenger traffic on each aircraft and calculate the recommended overbooking level as a function of three intermediate booking level calculations. The three intermediate booking levels are a demand-based booking level, an oversale-based booking level, and a prediction-based booking level. In the preferred embodiment, the recommended overbooking level is calculated as the weighted average of the three intermediate booking levels.

7 Claims, 5 Drawing Sheets

OVERBOOKING SYSTEM

BACKGROUND OF THE INVENTION

This invention relates to information management systems and, more particularly, to a system for use by airlines or other travel industry companies to determine recommended booking levels.

Common carriers, for example airlines, take advance reservations and book passengers on flights up to a predetermined booking level. Once this number of passengers is reached, the flight is deemed to be closed.

It is common practice for airlines to overbook flights to some extent. This is done because, often, some of the passengers with reservations do not actually take the flight. Thus, without overbooking, the flight would depart at less than capacity.

The overbooking level is generally expressed as a percent, greater than 100%, of the capacity of the aircraft. Each individual carrier sets its own overbooking levels based primarily on experience. A different overbooking level is set for each closed flight for each day of the week between each pair of cities. Consequently, many different overbooking levels must be determined by the airline. Of course, the overbooking level is a moot point for flights that never or rarely close.

By overbooking the flight, the carrier seeks to maximize its profits by using the total capacity of the vehicle. However, if the overbooking level is set too high, some of the passengers booked on the flight will be "bumped" from the flight, i.e. will not be seated because there are fewer "no shows" than passengers booked. This inconveniences passengers who may become dissatisfied with the carrier. Thus, while trying to maximize profits, most carriers try to minimize the number of "bumped" passengers.

Determination of the optimal overbooking level is complicated further by the fact that carriers often transport groups in addition to regular passengers. In general, however, since group booking is irregular, it should not be considered when determining the best overbooking level.

Also relevant is the number of standby passengers that are boarded on the flight and the number of standby passengers that are waiting but who cannot be boarded because the plane is full. If a flight regularly has stand-by passengers at the gate, the overbooking level need not be set as high as one that does not. So, determination of the optimal booking level should take the number of stand-bys into account.

As noted above, overbooking levels are generally decided by individuals based on past experience with a particular flight. In some cases, a carrier has partly automated this process by collecting information useful in determining the overbooking level using a computer and then having experienced individuals review the information to determine the best overbooking level. However, no one has previously devised a system for gathering information, storing the information, and using the information to automatically determine the optimal overbooking level and to adjust previously computed overbooking levels quickly based on new information in the manner described herein.

SUMMARY OF THE INVENTION

This invention is a system and method for booking passengers, on a vehicle belonging to a common carrier, based on passenger traffic information. The passenger traffic information includes the passenger capacity of the vehicle, the number of passengers scheduled to be transported on the vehicle, the number of passengers actually transported on the vehicle, the number of groups booked on the vehicle, the number of groups actually transported on the vehicle, the number of standby passengers desiring to be transported on the vehicle but not boarded, the number of standby passengers actually boarded on the vehicle, the number of "10 minute rule" passengers, the number of passengers who could not be transported because the capacity of the vehicle was exceeded, and the number of passengers that voluntarily agreed not to be transported because the vehicle's capacity was exceeded.

The booking system comprises a combination of an information receiving means for obtaining the traffic flow information and storing it for later use, a processing means for processing the traffic flow information obtained by the information receiving means, calculating means, as part of the processing means, for calculating a recommended overbooking level as a function of the traffic flow information so that the number of passengers that can be booked on the vehicle is set at an optimal level for producing maximum revenue while minimizing the number of dissatisfied passengers, and a booking means for allowing passengers to make reservations up to the recommended booking level.

The recommended overbooking level is calculated by taking the average of three other booking levels. The first is a demand-based booking level which is based on average "no show" factors. The demand-based overbooking level is calculated such that the vehicle would always be full given average booking statistics.

The second is an oversale-based booking level which is based on average booking statistics and a standard deviation value which takes predictability into account. The oversale-based booking level is calculated such that the capacity of the vehicle will be oversold a predetermined percentage of the time.

The final booking level is a prediction-based booking level. This booking level predicts the optimal booking level for the next flight by averaging the the demand-based and oversale-based booking levels and determining the linear relationship of the averages. A weighting factor is also applied to the prediction-based booking level. The weighting factor is a function of the mathematical credibility (i.e. the standard error of estimate) of the third booking level.

The recommended booking level is then determined by averaging the demand-based booking level, the oversale-based booking level and the weighted prediction-based booking level.

The overbooking system disclosed herein can be used by any common carrier to recommend optimal booking levels. For the sake of simplicity, however, the overbooking system is described only in the context of an airline reservation system. It is understood, of course, that the description is equally applicable to other common carriers.

BRIEF DESCRIPTION OF THE DRAWINGS

FIG. 6 is a flow chart illustrating the operating of the forecasting logic of the passenger booking system;

DESCRIPTION OF THE PREFERRED EMBODIMENT

Figure 1:
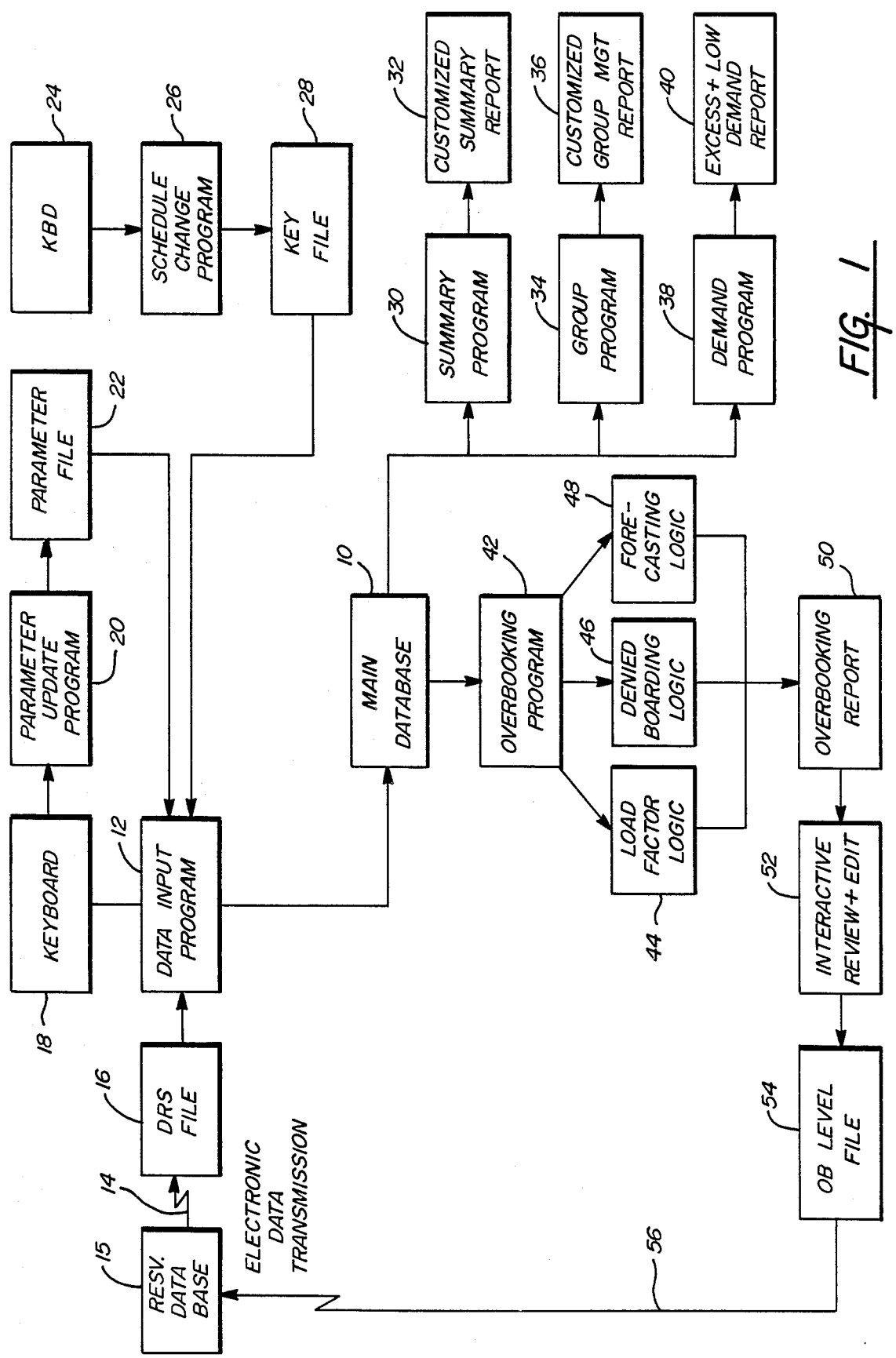
FIG. 1 is a block diagram of the passenger booking system of the present invention.

FIG. 1 illustrates, in block diagram form, the passenger booking system of the present invention. In its preferred embodiment, the passenger booking system performs a number of functions other than determining the optimal booking level. These functions include collection of data, sorting of data, and production of various reports.

The passenger booking system of the present invention may be used with any general purpose computer. In the preferred embodiment, the system is used with an IBM personal computer (not shown) such as the XT or AT. The computer includes information receiving means, such as a keyboard, communications port and disk drive for receiving information concerning the traffic flow for each flight and storing the information for later use. The computer also includes a processing means for operating the passenger booking system.

As seen in FIG. 1, the passenger booking system is centered around a main data base 10. The main data base stores the historical information necessary for the various parts of the booking system to operate. The main data base 10 includes the following information: the capacity of each passenger airplane in the fleet, the number of passengers scheduled to be transported on each airplane, the number of passengers actually transported on each airplane, the number of groups scheduled to be transported on each airplane, the number of passengers in groups actually transported on each airplane, the number of standby passengers actually transported on each airplane, the number of standby passengers that desired to be transported on each airplane but could not be boarded, the number of passengers, for each airplane, who could not be transported because the capacity of the airplane was exceeded, the number of passengers, for each airplane that voluntarily agreed not to be transported on the airplane because its capacity was exceeded, and the number of "10 minute rule" passengers.

"10 minute rule" passengers are passengers with reservations who did not check in at least 10 minutes before departure. Airline regulations permit these passengers to be bumped automatically from the flight.

The main data base also includes a predetermined, user-supplied load factor goal and a predetermined, user-supplied oversale ratio factor goal. These user-supplied factors are used to determine intermediate booking levels which, in turn, are used to determine the recommended booking level.

The information in the data base is placed there by a data input program 12. The data input program 12 obtains input from various sources and formats it for proper storage in the main data base 10.

The data input program 12 can receive data electronically from the main reservation data base files 15 via a data transmission link 14. The main reservation data base 15 is a booking means used by reservation personnel to make passenger reservations. The electronic data link 14 loads information into a DRS file 16 which, in turn, provides input to the data input program 12.

The data input program 12 can also receive input directly from a keyboard 18 or indirectly from a keyboard via a parameter update program 20 and parameter file 22. The parameter update program 20 is used to change the user-supplied load and oversale ratio factors and store them in the parameter file 22.

Data input program 12 also receives input indirectly from a keyboard 24 through which an airline employee can supply information to a schedule change program 26. The schedule change program updates the flight schedules and related information of the various aircraft and stores the information in key file 28. The schedule change program may also be used to merge historical traffic flow information of one flight into a newly created, but similar flight, for example, where it is expected that the two flight will have similar traffic characteristics.

The information in the main data base 10 is used by a summary program 30 which prepares a customized summary report 32 of the information in the data base. The customized summary report is used by airline personnel to track the traffic flow patterns of the airline. The summary can be customized for each flight and may include none, some, or all of the information contained in the data base for that flight.

The information in the main data base 10 is also used by a group program 34 which produces a customized group management report 36. The group program 34 and the group management report 36 are used by airline personnel to keep track of group bookings and follow traffic flow patterns of various groups. Again, the group management report 36 can be customized to present only selected information.

A demand program 38 also uses information from the main data base 10 to produce an excess and low demand report 40. The excess and low demand report contains information about the number of reservations made on each aircraft and is used to review booking characteristics for particular flights.

The summary program 30, the group program 34, and the demand program 38 are all relatively simple programs which take information from the main data base 10 and produce a report on a printer. Those skilled in the art will recognize that programs of this sort are commonplace and that no detailed description of these programs is necessary.

Likewise, the data input program 12, the parameter update program 20, and the schedule change program 26 are all programs which take input from the keyboard or a file and produce output in a particular format to a file. Again, those skilled in the art will recognize that these types of programs are common and that no detailed description of them is necessary.

Turning now to the overbooking program 42 in FIG. 1, the portion of the system that determines the recommended optimal booking level will now be described. The overbooking program 42 provides a means for calculating the recommended optimal booking level by taking the information collected in the main data base 10 and generating three intermediate booking levels which it uses in computing the recommended booking level. As noted previously, recommended booking levels are determined only for flights that ordinarily "close." For other flights, the booking level is normally set at 100% of capacity, i.e. the flight is never overbooked.

The first intermediate booking level is called the demand-based booking level. This booking level is calculated using load factor logic 44. The second intermediate booking level, the oversale-based booking level, is calculated using denied boarding logic 46. The third intermediate booking level, a prediction-based booking level, is computed using forecasting logic 48.

These three intermediate booking levels are combined by the overbooking program to produce a recommended optimal booking level. This recommended booking level is produced for each flight for each day of the week for each pair of cities where the flight stops. Thus, for a flight that travels daily between Detroit and Miami, making one stop in Atlanta, fourteen different recommended booking levels are generated, one for each day of the week and one for each city pair, Detroit/Atlanta and Atlanta/Miami. Of course, if one leg of the flight does not close regularly, no booking level is calculated for that leg.

The overbooking program 42 produces an overbooking report 50 which lists the recommended booking levels for each flight for which a calculation was performed. The recommended booking level information may be reviewed and even changed by an airline employee by using a keyboard and screen 52. The results of the interactive review and edit of the overbooking levels are stored in an overbooking file 54 where they can be retrieved by the airline reservation system personnel for use in determining whether a particular flight is sold-out.

The details of the overbooking program will now be explained with reference to FIGS. 2–6. In the following explanation, the term "flight unit" refers to all of the relevant, historical information for one flight for one day of the week between one pair of cities. For the Detroit to Miami example, above, the Monday flight from Detroit to Atlanta is one of fourteen "flight units." Each flight unit consists of a number of "historical units." An historical unit is the relevant information for one particular flight within the flight unit, e.g. the March 14th flight from Atlanta to Miami. Thus, all of the historical units occurring on the same day of the week make up a single flight unit and all of the flight units combine to make up. For example, the Detroit to Miami run.

A demand-based booking level for any given flight unit is determined by the following equations:

$$RATIO1 = \frac{PBDK - GBKD}{POUT - GOUT + OS + TM + SLAG} \quad (1)$$

$$DBBL = AVG\ OF\ RATIO1 \times LOAD\ FACTOR\ GOAL \quad (2)$$

RATIO1 is calculated for each historical unit. PBKD is the number of passengers booked on the flight. GBKD is the number of passengers booked as a group on the flight. POUT and GOUT are the number of passengers and the number of group passengers actually transported on the flight respectively. OS is the number of oversold passengers not transported on the flight. TM is the number of "10 minute rule" passengers that were denied boarding. SLAG is the number of standby passengers left at the gate.

RATIO1 represents the ratio of passengers (excluding groups) actually transported on one flight to the number of passengers who were at the gate and wanted to be boarded. In practical terms, it is the actual demand for a seat on the aircraft.

The demand-based booking level (DBBL) for a given flight unit is then computed by averaging RATIO1 for each historical unit in the flight unit and multiplying that value by a predetermined load factor goal. The load factor goal is determined by airline personnel for each flight unit and is entered in parameter file 22 via parameter update program 20. The predetermined load factor goal is usually in the range of 93% to 96%.

The oversale-based booking level (OBBL) is computed using the following formulas:

$$RATIO2 = \frac{PBKD - GBKD}{POUT - GOUT + OS + SOUT} \quad (3)$$

$$STD\text{-}DEV = \sqrt{\frac{\Sigma (RATIO2 - \overline{RATIO2})^2}{n}} \quad (4)$$

$$OBBL = (.875 + (.004 \times OVERSALE\ RATIO\ GOAL)) - \quad (5)$$
$$(.25 \times STD\text{-}DEV)$$

RATIO2, like RATIO1, is computed for each historical unit. SOUT in equation (3) is the number of standby passengers boarded on the flight.

RATIO2 represents the ratio of the passengers booked (excluding groups) to either (a) the number of passengers actually transported, if the flight was not filled to capacity, or (b) the number of booked passengers who arrived on time to take the flight, if the flight was filled to capacity. This is because one of the two values, OS or SOUT, is zero when the other is a positive value.

When OS is a positive number, it indicates that there were some booked passengers who arrived on time but who could not be boarded. If OS is positive, SOUT must be always be zero because no standby passengers should be boarded when on-time passengers with reservations are not. Conversely, if standby passengers were boarded, i.e., SOUT is a positive number, then OS should be zero indicating that there were no on-time, booked passengers that could not be boarded.

RATIO2, then, indicates the extend to which the flight was oversold or undersold using advance reservations.

Once RATIO2 is computed for each historical unit, the standard deviation of RATIO2 values is computed for the entire flight unit using equation (4). This indicates how predictability the flight oversells.

The standard deviation is then used to determine the oversale-based booking level (OBBL) using the equation (5) above. In equation (5), the constants have been determined by the inventor based on his experience with booking levels and booking ratios. The oversale ratio goal is a value determined by airline personnel and is entered into the parameter file 22 using keyboard 18 and parameter update program 20. The oversale ratio goal is the number of oversold passengers per 10,000. This goal is usually set between 10/10,000 and 20/10,000, depending on how aggressive the airline wishes to be in overselling seats.

The third intermediate value, the prediction-based booking level is computed by extrapolating results from the first two equations and trying the predict results for the next flight in the flight unit. This prediction is made by first averaging RATIO1 and RATIO2 for each historical unit and finding a line that best fits these averages using standard linear regression techniques. Then, a prediction-based booking level (PBBL) is determined by finding the point on the line for what would be the next historical unit.

Figure 2:
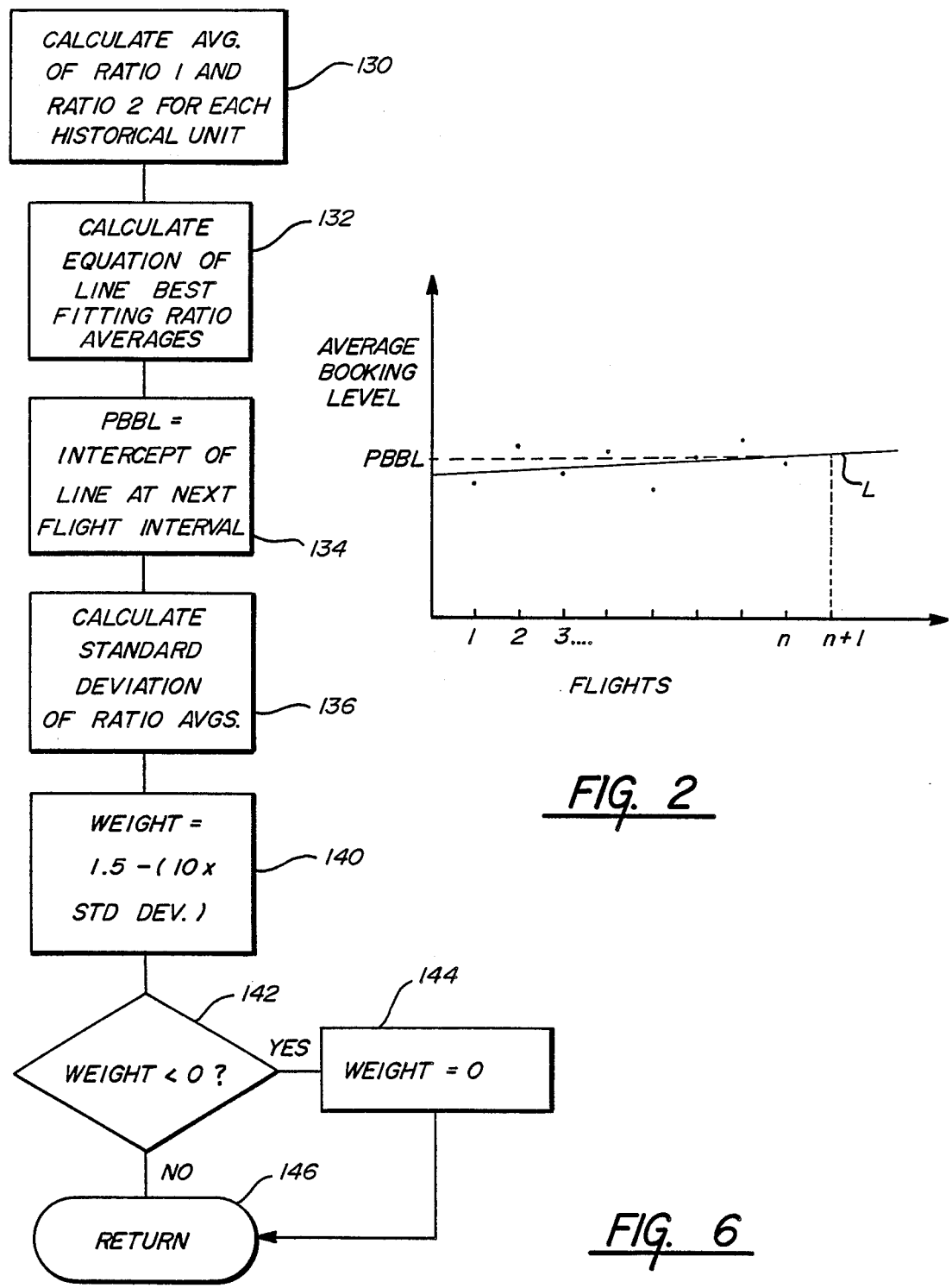
FIG. 2 is a graph illustrating the manner in which the prediction-based booking level is calculated.

The operation of the prediction-based booking level logic is best understood by reference to FIG. 2. Assume that there are N historical units in a given flight unit. For flight 1 (the first historical unit), an AVERAGE BOOKING LEVEL is computed by averaging RATIO1 and RATIO2 for that historical unit. AN AVERAGE BOOKING LEVEL for flight 2 is computed by averaging RATIO1 and RATIO2 for historical unit 2 and so on through historical unit N. The points on the graph represent the AVERAGE BOOKING LEVEL for each historical unit.

After all of the AVERAGE BOOKING LEVELS are calculated, the equation for line L is computed using standard linear regression techniques. The prediction-based booking level is then found by the following equation:

$$PBBL = M(N+1) + B \tag{6}$$

In this equation, M is the slope of the line L and B is the y-axis intercept of the line L. $N+1$ is the next historical unit, i.e. the next flight that will depart.

As the last step in determining the prediction-based booking level, the usefulness or weight of the prediction is determined using the standard deviation of the average booking levels according to the following equation:

$$WEIGHT = 1.5 - (10 \times STD-ERR) \tag{7}$$

STD—ERR is the standard deviation of the AVERAGE BOOKING LEVELS. The constants in the equation were chosen by the inventor based on his experience. The values are chosen such that, when the standard deviation is very small, the prediction-based booking level is given relatively great weight, and, when the standard deviation is large, the prediction-based booking level is given little or no weight.

The recommended optimal booking level (ROBL) is finally determined by taking the average of the demand-based booking level, the oversale-based booking level, and the weighted prediction-based booking level using the following formula:

$$ROBL = \frac{DBBL + OBBL + (PBBL \cdot WEIGHT)}{2 + WEIGHT} \tag{8}$$

As indicated earlier, the recommended booking level is subject to review by airline personnel to ensure that it meets with airline policy and experience. Thus, the recommended booking level is a recommendation but can be overridden at the airline's option.

The recommended booking level, either as calculated by the overbooking program or as altered by airline personnel, is placed directly into an overbooking file 54 (FIG. 1) where airlines reservation personnel have access to it to advise passengers whether a flight is closed.

Figure 3:
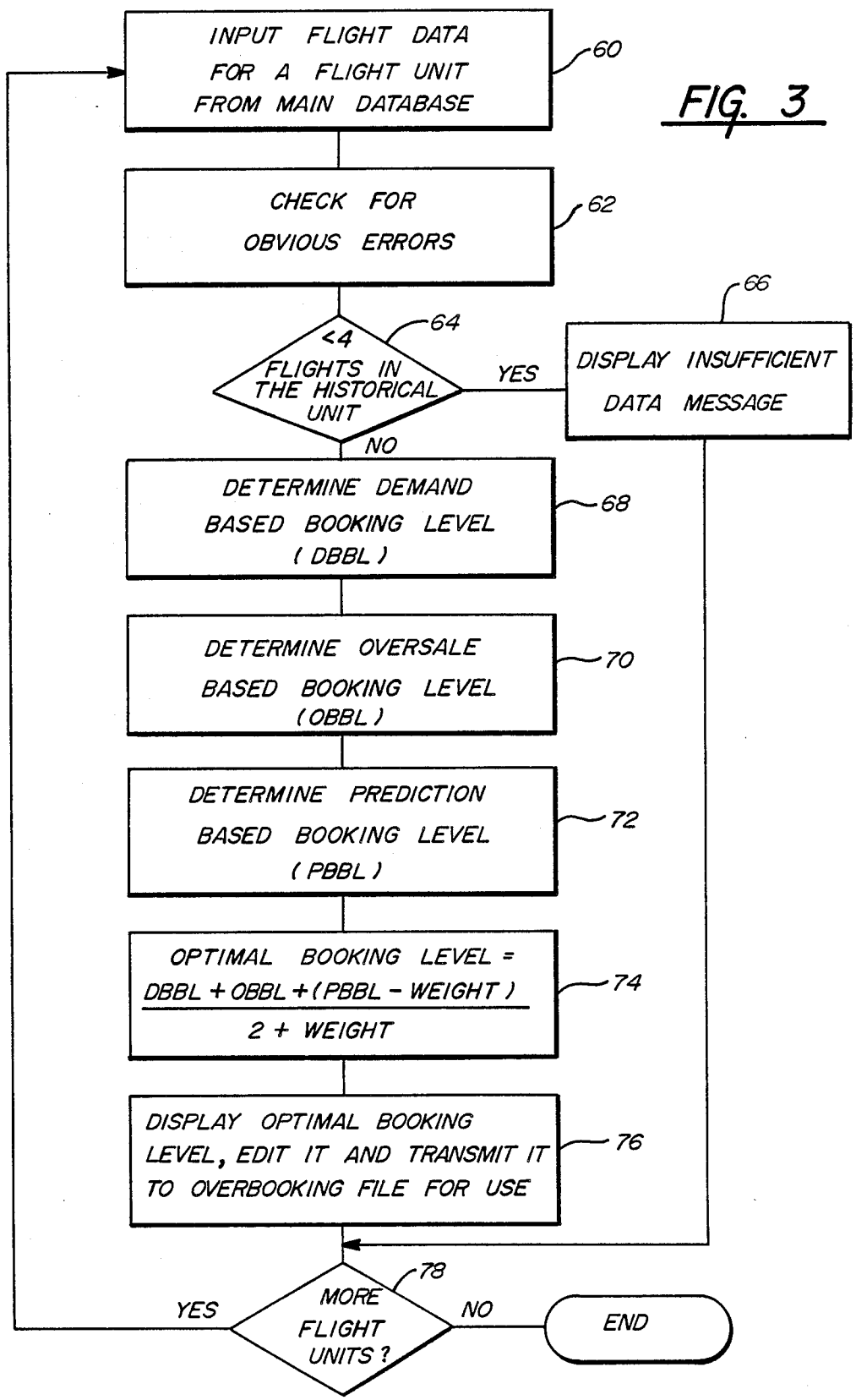
FIG. 3 is a flow chart illustrating the operation of the overbooking portion of the passenger booking system.

Turning now to FIG. 3, the overbooking level program will be described in detailed. The overbooking program performs the steps illustrated in FIG. 3 once for each flight unit for which an overbooking report is to be generated. The operator of the program may select specific overbooking reports or may generate an overbooking report for all closed flight units.

At step 60 in FIG. 3, the overbooking program obtains flight data from the main data base 10 (FIG. 1) for a particular flight unit. Each historical unit in the flight unit is then checked for obvious errors at step 62. Examples of obvious errors are when the number of passengers transported is greater than the capacity of the airplane or when standby passengers are transported on the flight while the booked passengers were not. If any obvious errors are found, the historical unit containing those errors is discarded; i.e., it is treated as if the flight never occurred.

At step 64, the historical units are checked to ensure that each contains at least four flights. Since the overbooking program uses historical information to determine the recommended overbooking level, a minimum number of flights must have occurred in order to ensure an accurate historical basis for the calculations. If there are less than four flight records, a message is displayed at step 66 to indicate that there is insufficient data to generate a recommended booking level.

Figure 4:
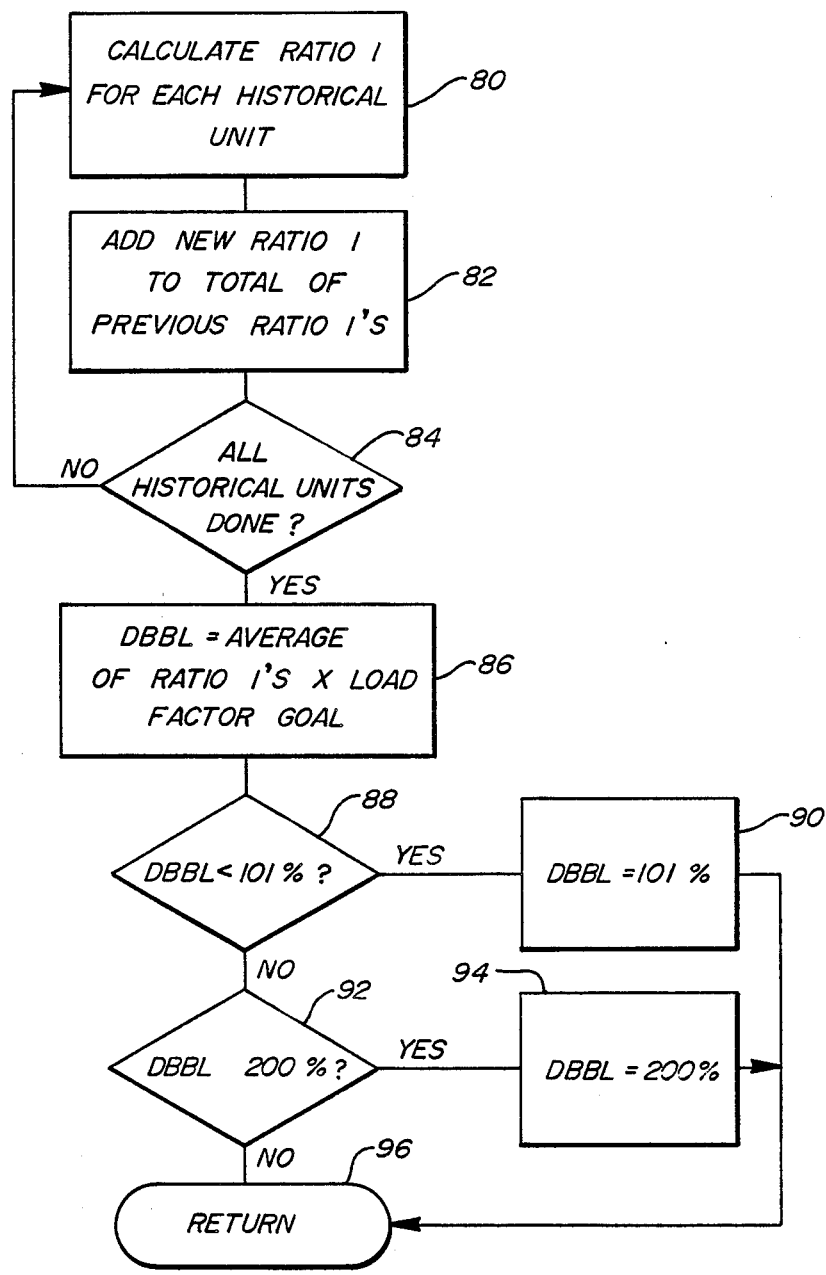
FIG. 4 is a flow chart illustrating the operation of the load factor logic of the passenger booking system.

If there is adequate historical data, the overbooking program, at step 68, computes the demand-based booking level using load factor logic 44 (FIG. 1). The details of load factor logic 44 are illustrated in FIG. 4, described below.

Figure 5:
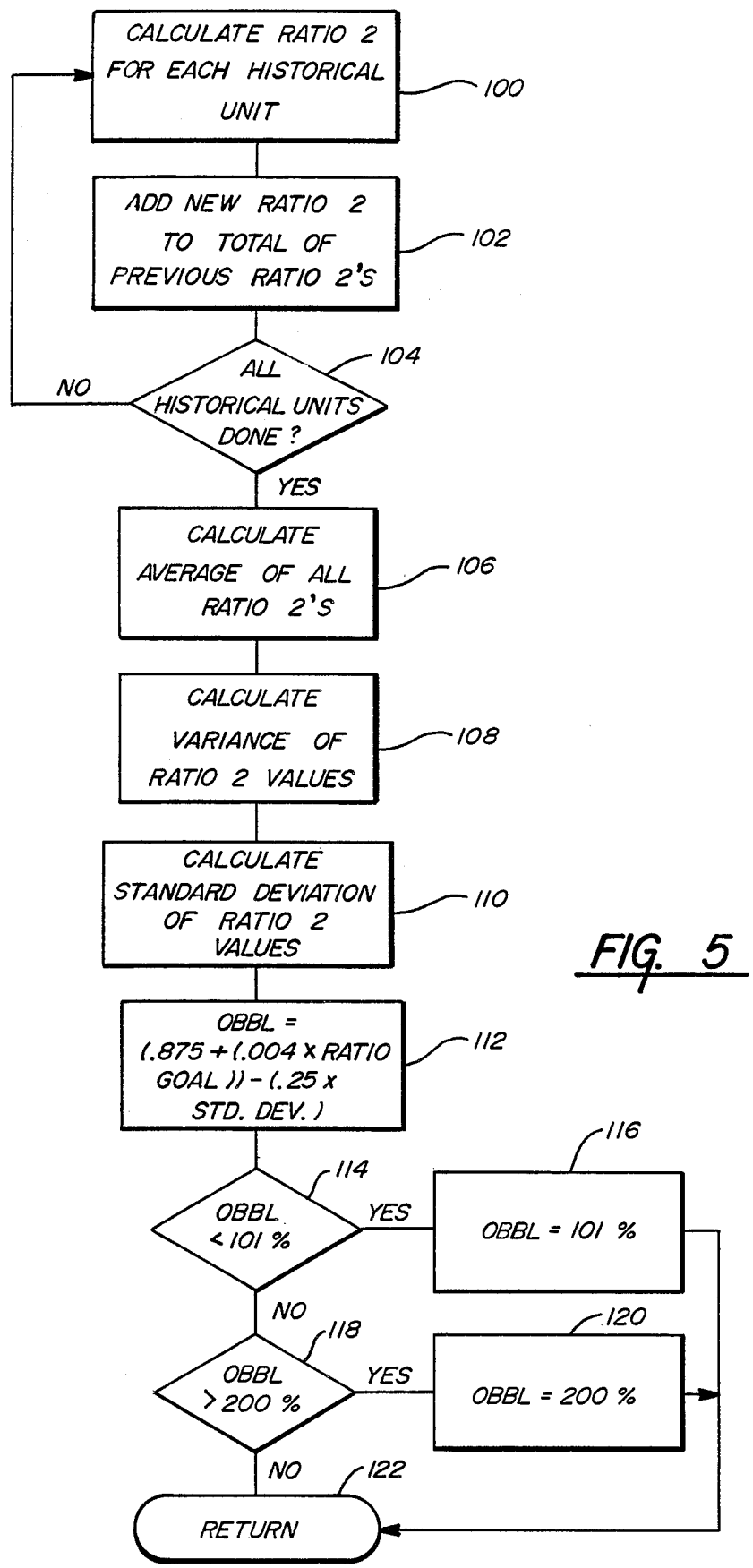
FIG. 5 is a flow chart illustrating the operation of the denied boarding logic of the passenger booking system.

The oversale-based booking level is then computed at step 70 using denied-boarding logic 46 (FIG. 1). Denied boarding logic 46 is illustrated in FIG. 5, described in detail below.

The overbooking program then computes the prediction-based booking level at step 72 using the forecasting logic 48 (FIG. 1). The forecasting logic is illustrated in FIG. 6, described in detail below.

At step 74, the overbooking program computes the recommended optimal booking level by computing the weighted average of the demand-based booking level, the oversale-based booking level, and the prediction-based booking level according to equation (8) above.

At step 76, the recommended booking level is displayed in an overbooking report and can be reviewed and edited by airline personnel before being transmitted to an overbooking level file for use by the reservation system.

Finally, the program checks whether there are any more flight units to process at step 78. If so, the overbooking program is cycled again for the next flight unit. If not, the program ends.

Referring now to FIG. 4, the details of load factor logic 46 are illustrated. At step 80, RATIO1 is computed, using formula (1), for each historical unit. At step 82, the newly computed RATIO1 is added to the RATIO1 values computed for other historical units within the flight unit. The result is a total of all RATIO1 values within the flight unit.

Step 84 checks to make sure that RATIO1 has been computed for all historical units. Until this has been done, load factor logic 44 continues calculating RATIO1 for each historical unit.

At step 86, once RATIO1 has been calculated for all historical units within the flight unit, the demand-based booking level is determined by taking the average of the calculated RATIO1 values (VAL/number of historical units) and multiplying the result by the predetermined load factor goal.

A consistency check is then made on the demand-based booking level to ensure that the demand-based booking level is above 101% and less than 200%. If, at step 88, the demand-based booking level is less than 101%, the demand-based booking level is set at 101% at step 90. Otherwise, if the demand-based booking level, at step 92, is greater than 200%, the demand-based booking level is set at 200% in step 94.

The load factor logic then returns the demand-based booking level to the overbooking program at step 96.

The denied-boarding logic 46 is illustrated in detail in FIG. 5. At step 100, RATIO2 is calculated, using formula (3), for each historical unit within the flight unit. At step 102, the RATIO2's for the historical units are totalled. The calculation of RATIO2 continues at step 104 until all historical units in the flight unit have been processed.

Next, formula (4) calculations are made. The average of the RATIO2's is calculated at step 106. At step 108, the variance of the RATIO2 values is calculated and, at step 110, the standard deviation of those values is calculated.

The oversale-based booking level is then determined using formula (5). In steps 114, 116, 118 and 120, the oversale-based booking level is checked to ensure that it falls within the range 101% to 200%, inclusive. Finally, the oversale-based booking level is returned to the overbooking program at step 122.

The prediction-based booking level is calculated using the forecasting logic 48, illustrated in detail in FIG. 6. First, in step 130, the average of RATIO1 and RATIO2 is calculated for each historical unit. Each average is an AVERAGE BOOKING LEVEL, as illustrated in FIG. 2. Then, the equation of a line best fitting the calculated averages is computed using standard linear regression techniques in step 132.

The prediction-based booking level is determined in step 134 by finding the intercept of the regression line at the next flight interval using formula (6) above.

The standard deviation of the averaged ratio values is computed in step 136 and used in step 138 to determine the weight to be given to the prediction-based booking level. If the weight is less than zero, in step 140, the weight is set equal to zero in step 142. Finally, the prediction-based booking level and its weight are returned to the overbooking program at step 144. The overbooking program then computes the recommended optimal booking level using formula (8) as described earlier.

From the foregoing description, it is apparent that the system of the present invention computes an overbooking level based on three different factors. The inventor has determined that these factors generate an optimal booking level for a particular flight unit based on that flight unit's history. Of course, however, there may be other ways of calculating an overbooking level using similar equations and similar information about the flight which do not depart from the spirit and scope of the present invention.

In addition, through experimentation, the inventor has determined that certain constants should be used in calculating the various intermediate booking levels. These constants may, of course, be varied to a certain extent without significantly changing the operation of the invention.

It must also be noted that the inventor is not attempting to preclude all use of his calculations and formulae, but claims patent protection for them only to the extent they are used as part of the system and method claimed below.

Finally, it should be understood that the system and method described and claimed herein is not limited soley to overbooking for common carriers. For example, other travel industry companies, e.g. hotels and car rental agencies, overbook their resources, e.g. rooms and fleet vehicles, in the same way common carriers overbook seats on a vehicle. Consequently, the terms used in the specification and claims are to be read and interpreted broadly to encompass not only seats on a vehicle, but any resource in high demand.

I claim:

1. A system for booking passengers on a vehicle in response to a recommended overbooking level based on traffic flow information, the traffic flow information comprising the passenger capacity of the vehicle, the number of passengers scheduled to be transported on the vehicle, the number of passengers actually transported on the vehicle, the number of passengers scheduled to be transported on the vehicle as a group, the number of passengers actually transported on the vehicle as a group, the number of standby passengers actually transported on the vehicle, the number of standby passengers desiring to be transported on the vehicle but not boarded, the number of ten minute rule passengers, and the number of passengers refused transportation because the capacity of the vehicle was exceeded, the system comprising the combination of:

information receiving means for obtaining the traffic flow information and storing it for later use;

booking means for receiving the recommended overbooking level and for allowing passenger reservations up to the recommended overbooking level;

processing means for processing the traffic flow information obtained by the information receiving means, the processing means having calculating means for calculating said recommended overbooking level as a function of the traffic flow information so that the number of passengers to be booked on the vehicle is set at an optimal level for producing maximum revenue while minimizing the number of dissatisfied passengers, said calculating means including means for:

(a) calculating a demand-based booking level as a function of the number of passengers scheduled to be transported, the number of passengers scheduled to be transported as a group, the number of passengers actually transported, the number of passengers actually transported as a group, the number of passengers refused transportation because the capacity of the vehicle was exceeded, the number of ten minute rule passengers, the number of standby passengers desiring to be transported but who could not be boarded, and a user supplied load factor goal, (b) calculating an oversale-based booking level as a function of the number of passengers scheduled to be transported, the number of passengers scheduled to be transported as a group, the number of passengers actually transported, the number of passengers actually transported as a group, the number of passengers refused transportation because the capacity of the vehicle was exceeded, the number of stand-by passengers that actually were transported, and a user supplied experience factor, (c) calculating a prediction-based booking level as a function of the demand-based booking level and the oversale-based booking level, and (d) calculating the recommended overbooking level as a function of the demand-based booking level, the oversale-based booking level, and the prediction-based booking level, said processing means operable to control said booking means so as to minimize the number of dissatisfied passengers while maximizing the profits of the carrier by preventing potential passengers from making reservations through said reservation system when said recommended booking level has been exceeded.

2. The system of claim 1 wherein the average said demand-based booking level has a standard deviation, the calculating means includes means for calculating a weighting factor for the prediction-based booking level as a function of the standard deviation of the average of the demand-based booking level and the oversale-based booking level and wherein the calculating means calculates the recommended overbooking level by averaging the demand-based booking level, the oversale-based booking level and the weighting factor multiplied by the prediction-based booking level.

3. The system of claim 1, wherein said processor means allows reviewing and editing of the recommended overbooking level by said carrier so as to conform said recommended overbooking level to an established policy of said carrier.

4. A method of determining a recommended overbooking level for a vehicle reservation system so that the advance passenger bookings for the vehicle are at a level which maximizes profits for the carrier while, at the same time, minimizes the number of dissatisfied passengers, comprising the steps of:

(a) collecting information about similar trips made previously by passengers on the vehicle, the information comprising the passenger capacity of the vehicle, the number of passengers scheduled to be transported on the vehicle, the number of passengers actually transported on the vehicle, the number of passengers scheduled to be transported on the vehicle as a group, the number of passengers actually transported on the vehicle as a group, the number of standby passengers actually transported on the vehicle, the number of standby passengers desiring to be transported on the vehicle but not boarded, the number of ten minute rule passengers, and the number of passengers refused transportation because the capacity of the vehicle was exceeded;

(b) calculating a demand-based booking level as a function of the number of passengers scheduled to be transported, the number of passengers scheduled to be transported as a group, the number of passengers actually transported, the number of passengers actually transported as a group, the number of passengers refused transportation because the capacity of the vehicle was exceeded, the number of ten minute rule passengers, the number of standby passengers desiring to be transported but who could not be boarded, and a user supplied load factor goal;

(c) calculating an oversale-based booking level as a function of the number of passengers scheduled to be transported, the number of passengers scheduled to be transported as a group, the number of passengers actually transported, the number of passengers actually transported as a group, the number of passengers refused transportation because the capacity of the vehicle was exceeded, the number of stand-by passengers that were transported, and a user supplied experience factor;

(d) calculating a prediction-based booking level as a function of the demand-based booking level and the oversale-based booking level;

(e) calculating the recommended overbooking level as a function of the demand-based booking level, the oversale-based booking level, and the prediction-based booking level; and (f) controlling said reservation system so as to minimize the number of dissatisfied passengers while maximizing the profits of the carrier by preventing potential passengers from making reservations through said reservation system when said recommended booking level has been exceeded.

5. The method of claim 4 wherein the average of said demand-based booking level has a standard deviation, said method further including the step of calculating a weighting factor for the prediction-based booking level as a function of the standard deviation of the average of the demand-based booking level and the oversale-based booking level and wherein the recommended overbooking level is calculated by averaging the demand-based booking level, the oversale-based booking level and the weighting factor multiplied by the prediction-based booking level.

6. A method of determining a recommended overbooking level for a vehicle reservation system so that the advance passenger bookings for the vehicle are at a level which maximizes profits for the carrier while, at the same time, minimizes the number of dissatisfied passengers, comprising the steps of:

(a) collecting information about similar trips made previously by passengers on the vehicle, the information comprising the passenger capacity of the vehicle, the number of passengers scheduled to be transported on the vehicle, the number of passengers actually transported on the vehicle, the number of passengers scheduled to be transported on the vehicle as a group, the number of passengers actually transported on the vehicle as a group, the number of standby passengers actually transported on the vehicle, the number of standby passengers desiring to be transported on the vehicle but not boarded, the number of ten minute rule passengers, and the number of passengers refused transportation because the capacity of the vehicle was exceeded;

(b) calculating a demand-based booking level as a function of the number of passengers scheduled to be transported, the number of passengers scheduled to be transported as a group, the number of passengers actually transported, the number of passengers actually transported as a group, the number of passengers refused transportation because the capacity of the vehicle was exceeded, the number of ten minute rule passengers, the number of standby passengers desiring to be transported but who could not be boarded, and a user supplied load factor goal;

(c) calculating an oversale-based booking level as a function of the number of passengers scheduled to be transported, the number of passengers scheduled to be transported as a group, the number of passengers actually transported as a group, the number of passengers refused transportation because the capacity of the vehicle was exceeded, the number of stand-by passengers that were transported, and a user supplied experience factor;

(d) calculating a prediction-based booking level as a function of the demand-based booking level and the oversale-based booking level;
(e) calculating the recommended overbooking level as a function of the demand-based booking level, the oversale-based booking level, and the prediction-based booking level;
(f) reviewing and editing the recommended overbooking level by said carrier so as to conform said recommended overbooking level to an established policy of said carrier; and
(g) controlling said reservation system so as to minimize the number of dissatisfied passengers while maximizing the profits of the carrier by preventing potential passengers from making reservations through said reservation system when said recommended booking level has been exceeded.

7. The method of claim 6 wherein the average of said demand-based booking level has a standard deviation, said method further including the step of calculating a weighting factor for the prediction-based booking level as a function of the standard deviation of the average of the demand-based booking level and the oversale-based booking level and wherein the recommended overbooking level is calculated by averaging the demand-based booking level, the oversale-based booking level and the weighting factor multiplied by the prediction-based booking level.

* * * * *